United States Patent [19]
Parker et al.

[11] Patent Number: 4,965,778
[45] Date of Patent: Oct. 23, 1990

[54] HELICAL MAGNETOSTRICTIVE CORE LINE HYDROPHONE

[75] Inventors: David E. Parker, Pawcatuck; Markay Malootian, Quaker Hill, both of Conn.

[73] Assignee: The United States of America as represented by the Secretary of the Navy, Washington, D.C.

[21] Appl. No.: 827,252

[22] Filed: May 23, 1969

[51] Int. Cl.$^5$ .................................. H04R 15/00
[52] U.S. Cl. ................................................ 367/168
[58] Field of Search .............. 340/7, 11; 367/168, 367/26, 118

[56] References Cited

U.S. PATENT DOCUMENTS

| | | | |
|---|---|---|---|
| 2,631,271 | 3/1953 | Thuras | 340/11 |
| 2,761,077 | 8/1956 | Harris | 340/11 X |
| 2,977,569 | 3/1961 | Harris | 340/11 X |

Primary Examiner—Thomas H. Tarcza
Assistant Examiner—David Cain
Attorney, Agent, or Firm—Michael J. McGowan; Prithvi C. Lall

[57] ABSTRACT

A magnetostrictive flexible line hydrophone having a magnetostrictive element which is an annealed nickel strip within a toroidal winding. Electrical wires are disposed inside the cylinder formed by the nickel strip and abut a pressure release material about which the strip has been wound. These wires form a toroidal winding by coupling to a second group of insulated wires disposed against the outer surface of the nickel strip.

4 Claims, 1 Drawing Sheet

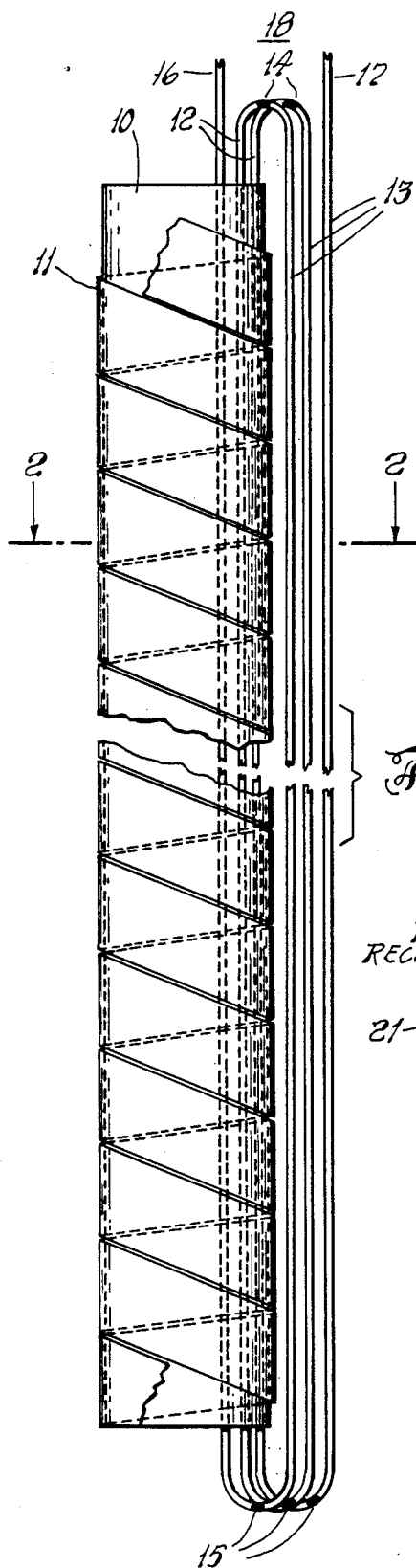
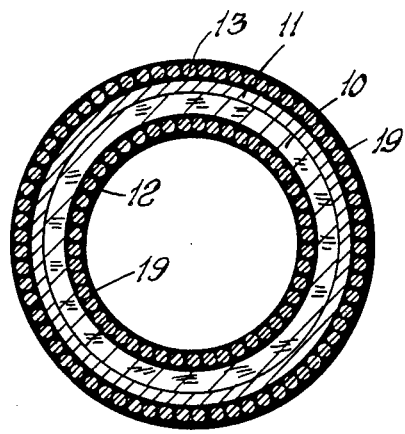
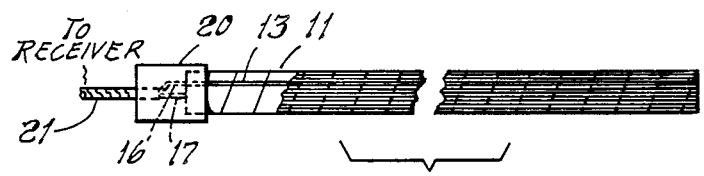
Fig. 1
Fig. 2
Fig. 3

HELICAL MAGNETOSTRICTIVE CORE LINE HYDROPHONE

The invention described herein may be manufactured and used by or for the Government of the United States of America for governmental purposes without the payment of any royalties thereon or therefor.

BACKGROUND OF THE INVENTION

1. Field of the Invention

The present invention relates to underwater communication and long range detection and more particularly pertains to a flexible line hydrophone which may be economically manufactured in continuous lengths.

2. Description of the Prior Art

In the field of underwater communication and acoustic detection it has been the practice to employ transducers and hydrophone of the unitary and solid form wherein the sensitive element or structure is relatively rigidly supported and is of a limited length. Such devices, especially line hydrophones, have been unsatisfactory in that their length and therefore their range utility have been severely restricted. The present invention fills this need in that it can be economically fabricated in a continuous manner and therefore in any desired length.

SUMMARY OF THE INVENTION

The general purposes of the instant invention is to provide a hydrophone that has all the advantages of similarly employed prior art devices and has none of the above described disadvantages. To attain this, the present invention provides a unique structural magnetostrictive flexible line hydrophone which comprises a nickel strip helically wound about a tubular pressure release flexible material. An insulated toroidal winding is provided about the combination of the nickel helix on the pressure release tube and the entire structure waterproofed with a silicone rubber. The entire hydrophone can be of any desired length because the toroidal winding can be formed of separate lengths of wire running through the tube and corresponding separate lengths of wire alongside the exterior of the helix and joined at their ends thereafter.

An object of the present invention is to provide a reliable, inexpensive and simple magnetostrictive flexible line hydrophone.

Another object is to provide a line hydrophone which may be readily fabricated in any desired length or alternately of relatively short lengths joined to form a longer length.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 1 is a length view of a line hydrophone made in accordance with the principal of this invention, broken in the length dimension and with the wire lengths of the winding shown separated for illustration and not including waterproofing material;

FIG. 2 is a sectional view take approximately along 2—2 of FIG. 1 but with the wire lengths close to one another and to the other elements and forming a complete toroid; and, FIG. 3 is an illustration of a complete underwater line hydrophone.

DESCRIPTION OF A PREFERRED EMBODIMENT

In the illustrated embodiment of FIG. 1 a hollow thin walled tubular section 10 of a pressure release material such as air filled rubber, cork and rubber, paper or other suitable flexible material dependent on the depth of use, has helically wound thereabout a thin strip of annealed nickel 11. The nickel before wrapping is annealed at approximately 900° C. A plurality of relatively small diameter, electrically insulated, waterproof wires 12 are disposed in a singular layer against the inner surface of the tubular section 10 lengthwise thereof so as to form a longitudinally extending ring. A similar ring of wires 13 are disposed against the outer face of the tube formed by the helically wound nickel strip. Since these wires are applied separately the entire structure can be made as long as is desired without any complex or expensive winding operation. The corresponding ends of the respective wires 12 and 13 are soldered or mechanically joined together as at 14 and 15 so as to form a closed toroidal winding about the helical nickel strip. The ends 16 and 17 of the completed winding are brought out as at 18 for connection to an external system.

The entire structure is then encapsulated or provided with a coating of any suitable waterproof material such as RTV silicone rubber which is shown in FIG. 2 at 19. The ends of the winding are encapsulated in a matrix at 20 and connected to a waterproof cable 21 as clearly shown in FIG. 3 for coupling to a remote receiver.

We claim:

1. A magnetostrictive flexible line hydrophone which comprises:
    a flexible hollow thin-walled tube of a pressure release material,
    a thin flat ribbon-likestrip of magnetostrictive material helically wound about and against the outer surface of said tube,
    an inner layered group of equal length insulated electrical conductors longer than the tube disposed longitudinally within the tube and adjacent the inner surface of said tube and extending beyond the ends of the tube,
    an outer layered group of insulated electrical conductors of the same number and length as the inner group and disposed longitudinally of and adjacent the outer surface of said helically wound magnetostrictive strip,
    electrically conductive means joining all but one of the ends of said inner group of conductors to all but one of the ends of said outer group of conductors respectively to form a toroidal winding about said helically wound strip, whereby said strip is a magnetic core of the toroidal winding,
    whereby when the two non-connected conductor ends are connected to a receiver and said line hydrophone placed in water the presence of acoustical energy will be detected.

2. The hydophone according to claim 1 further including an encapsulating layer of an acoustically transparent waterproof material surrounding said hydrophone.

3. The hydrophone according to claim 2 wherein said magnetostrictive material is annealed nickel.

4. The hydrophone according to claim 3 wherein said electrically conductive means are solder joint.

* * * * *